United States Patent [19]

Charlebois et al.

[11] Patent Number: 4,629,597
[45] Date of Patent: Dec. 16, 1986

[54] FORMING OF CABLE SPLICE CLOSURES

[75] Inventors: Leonard J. Charlebois, Kanata; Allan P. Brown, Ottawa; James R. Scott, Ashton, all of Canada

[73] Assignee: Northern Telecom Limited, Montreal, Canada

[21] Appl. No.: 752,750

[22] Filed: Jul. 8, 1985

[51] Int. Cl.[4] .................. B29C 39/18; H01B 13/32; H01R 43/00
[52] U.S. Cl. ........................ 264/278; 29/868; 156/48; 156/49; 156/53; 249/91; 264/36; 264/262; 264/272.15; 425/11; 425/108
[58] Field of Search ........... 264/272.11, 272.15, 264/275, 278, 279.1, 36, 256, 262; 156/48, 49, 51, 56, 53; 249/40, 89, 91, 90, 95; 425/11, 108; 403/265–267, 269; 29/868

[56] References Cited

U.S. PATENT DOCUMENTS 1,486,893  3/1924  Himes ........................ 264/262 X
4,436,276  3/1984  Donahue ........................ 249/91

Primary Examiner—Jan Silbaugh
Assistant Examiner—Leo B. Tentoni
Attorney, Agent, or Firm—R. J. Austin

[57] ABSTRACT

A method of forming a molded encapsulation around a sealed spliced region between two cables in which the cables pass through a mold with the splice region in the mold cavity and correctly centered before molding. To allow for the centering operation to be performed, apertures are provided in the mold. Hook members are passed through the apertures. These hook members are caused to engage both inner and outer mold surfaces and they also engage tie means at two circumferentially spaced positions around the splice region to centralize the region within the cavity. The mold is then filled with molten material and the hooks removed from the apertures with the material still molten. Hook removal may take place either when the cavity is completely filled or after sufficient molten material has entered the mold to hold the splice region in fixed position. The method is applicable to low pressure molding, i.e. below 100 psi and preferably below 50 psi.

3 Claims, 4 Drawing Figures

FORMING OF CABLE SPLICE CLOSURES

This invention relates to the forming of cable splice closures.

A telecommunications cable extending from a central office and for underground or aerial use comprises a core having a plurality of pairs of individually insulated conductors. There may be up to 3600 pairs of conductors in the core. When laying cable, it is sometimes necessary to join conductors of cables together to achieve a required length of cable or for the provision of a service wire to customers' premises. The cables may be joined end-to-end. Conventionally, in such situations, conductors are spliced together from cable-to-cable by removing the end portions of core surrounding material, i.e. cable sheaths and jackets so that the cores project beyond them. The cable cores are then brought close together and the conductor ends are joined to form splices. Alternatively, when service wires are connected to cables, it is sufficient to cut into the main cable to enable conductors to be reached and then these conductors are severed and brought out through the jacket and sheath for connection to the service conductors thereby forming splices. In all situations the splices are sealed thereby forming a sealed splice region. It has now become commercially accepted practice to enclose such splice regions in a closure which is formed as an encapsulation by molding techniques. Such a construction is described in U.S. Pat. Nos. 4,152,539 granted May 1, 1979 and 4,322,573 granted Mar. 13, 1982, both patents being in the name of L. J. Charlebois.

While the construction using a molded encapsulation is commercially successful and is cheaper than more established closure practices including the use of heat shrinkable materials, nevertheless problems have been found in the centralization of a splice region within the mold cavity. During insertion of the splice region within the cavity before the mold is completely closed, it may appear that the splice region is centralized with regard to the cavity. However, curving of the cable away from the mold at either side may cause lateral displacement of the splice region after mold closure and during the encapsulation process. If the splice region is allowed to touch the wall of the cavity or becomes too close to the wall during molding, the splice region will not be completely encapsulated and will thus be not completely protected from the outside environment. Furthermore, surface blemishes may appear just after molding and these have been attributed to poorly centered splices. Such blemishes are caused by non-uniform cooling rates of the various thickness encapsulation material with a badly centered splice region. It is essential to ensure that in every encapsulation process, the splice region is substantially centered within the mold cavity so that the above disadvantages are avoided and this success in centralization of the splice region should be obtained without demanding extra care or special training on the part of the craftsman forming the encapsulation. Any method used for centering a splice region should not degrade the splice or encapsulation in any way, such as reducing impact strength, providing potential paths for air leaks or water ingress, or result in cracking due to temperature cycling.

Attempts have been made to center a splice region in a mold cavity by straightening the cable outside the mold. This method has had some success, but is still sensitive to the skill of the craftsman and other operational conditions such as a tendency for a straightened cable to return towards its original curved condition thus moving the splice region inside the mold cavity.

In order to ensure that a splice region is centered within a mold cavity, spacing rings have been suggested in the past. Such a construction has been described in Canadian Pat. No. 1,127,255, granted Jul. 6, 1982 in the name of L. J. Charlebois and entitled "Encapsulation Of Telecommunication Cable Splices". Spacing rings surround the splice region and contact the wall of the mold cavity. As a result such rings need to be molded in position within the encapsulation. This has had the result of reducing the impact strength of the encapsulation significantly at cold temperatures, and also it cannot be guaranteed that the spacing rings will form an airtight bond to the encapsulating material.

In addition to Canadian Pat. No. 1,127,255, the use of rings for centering cables or conductors within molds has been suggested previously in French Pat. No. 1,490,086 and in German Offenlegunsschrift No. 2,325,764. In addition to this, spacing rings are used normally in a coaxial cable construction in which a central conductor is held concentrically with regard to a surrounding cylindrical conductor by spacing rings. Such constructions are shown in U.S. Pat. No. 3,813,479 granted May 24, 1974 in the name of Olivero and entitled "Coaxial Cable Joint" and also in U.S. Pat. No. 2,332,529 granted Oct. 26, 1943 in the name of H. E. Reppert and entitled "Coaxial Transmission Line". A further disclosure of this type of construction is also included in U.S. Pat. No. 1,859,390 granted May 24, 1932 to E. I. Green and entitled "Concentric Conductor System".

The present invention provides a method of forming an encapsulation around a sealed splice region in which the above disadvantages are avoided.

Accordingly the present invention provides a method of forming an encapsulation around a sealed splice region between two cables comprising disposing the cables within a mold to locate the splice region therein, the splice region having tie means secured to it, then inserting at least two hook members through apertures in the mold, the hook members engaging the mold on inner and outer surfaces to retain them in a fixed position in relation to the mold cavity and also engaging the tie means at two circumferentially spaced positions around the splice region so as to hold the splice region disposed in a desired position within the cavity and spaced from the mold parts; filling the mold cavity with molten encapsulating material; and removing the hook members from the mold with the encapsulating material still in a flowable condition.

Preferably, the hook members are removed from the mold immediately after the mold has been filled. In this case the material is still in a highly flowable molten condition so that only slight force needs to be used for removal of the members. The highly flowable encapsulating material will then flow to occupy any voids within the mold cavity formed by removal of the hook members. In any case for it to be possible to remove the hook members the encapsulation material must still be in a flowble condition. It is found that after removal of the hook members, there is no tendency for the splice region to move within the mold cavity, because it is retained in its position by the encapsulating material even though this still may be in a molten state. Alternatively, the hook members may be removed from the mold as the mold is being filled. This should be done after the molding material has reached the hook members themselves and after sufficient encapsulating material is within the mold to ensure that the splice region will not move out of its fixed position.

One embodiment of the invention will now be described by way of example, with reference to the accompanying drawings, in which.

Figure 1:
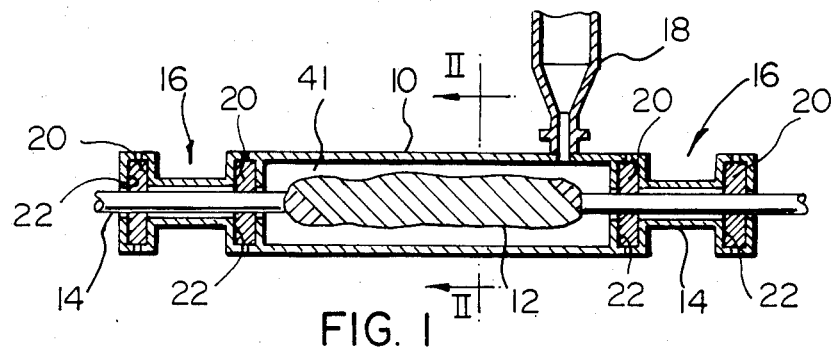
FIG. 1 is a side elevational view of a splice region between two cables and showing the splice region mounted within a mold cavity.

The embodiment is concerned with a method of molding an encapsulation around a splice region of a telecommunications cable. The mold is to operate at low mold pressures, i.e. below 100 lbs. psi and mainly below 50 lbs. psi and may be of thin wall structure because of this low pressure. The mold 10 is shown in FIG. 1 in a closed condition and surrounds a spliced region 12 of a cable 14 which extends outwards from both end regions of the mold.

As shown by FIG. 1, the mold is for use in molding a plastics encapsulation around the splice region in an in situ situation, that is at the bottom of a pit in the ground for encapsulating and sealing splices formed in underground cable. The molding operation in such an in situ situation may be performed by the method and using the apparatus described in copending U.S. patent application Ser. No. 668,601 filed Nov. 5, 1984 in the name of L. J. Charlebois and entitled "Encapsulating Articles" and in U.S. patent application Ser. No. 668,600 also filed on Nov. 5, 1984 in the name of L. J. Charlebois and entitled "Molding Plastics Encapsulation". As described in the above patent applications, the molding operation is performed by a manually portable container 18 for molten plastics material. The container has a reservoir for the molten material and a heating and heat insulating means (not shown) for rendering into a plastics and moldable form, non-molten material placed within the reservoir prior to the molding operation. Each end region 16 of the mold 10 is provided with two seals 20 mounted in annular recesses 22.

Figure 2:
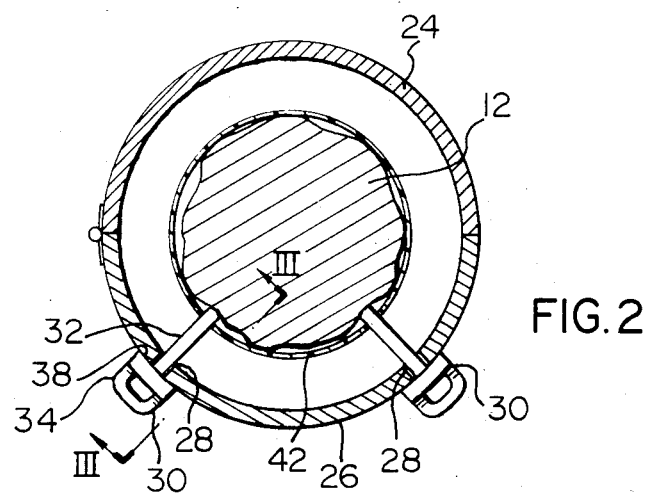
FIG. 2 is a cross-sectional view through the mold and the splice region taken along line II—II in FIG. 1 and on a larger scale.

As shown by FIG. 2, the mold is formed of two mold halves 24 and 26 which are hinged together along their lengths. Fastenings (not shown) are provided along the length of the mold to hold it in a closed condition, i.e. as shown by FIG. 2. One mold half is provided with two apertures 28 which are spaced apart circumferentially of the mold half for accepting two hook members 30. Each hook member comprises a shank 32 having at one end an enlarged head 34 by which it may be gripped. Along the length of the shank is disposed a projection 36 (FIG. 3) which together with an abutment surface 38 of the head provides an annular gap within which is accommodated the wall of the mold half 26 when the hook member is passed through the aperture. At the other end of the hook member is provided an integral hook 40 which extends in the same direction as the projection 36.

The splice region is formed by connecting together conductor ends of the two cables to form splices and then sealing these splices by wrappings of ethylene-propylene tape material which are wrapped around the cables across the region of the splices to produce the splice region 12. By this means the splices are electrically isolated from each other. It is also intended that during the molding operation, the heat from the encapsulated material will fuse together the overlapped wrappings of the ethylene-propylene tape material to form it into an integral whole surrounding each individual splice.

Figure 3:
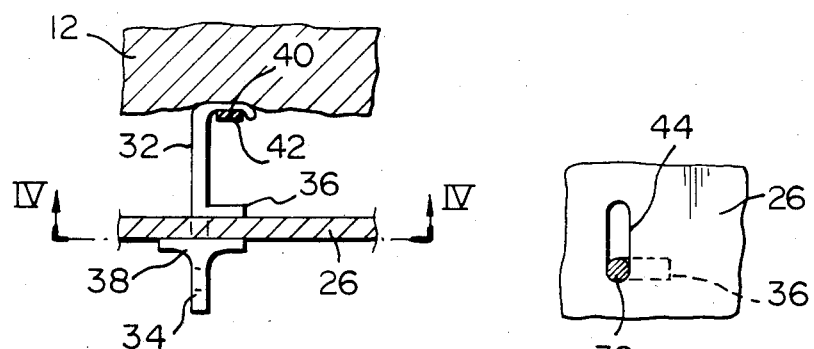
FIG. 3 is a cross-sectional view taken along line III—III in FIG. 2.
Figure 4:
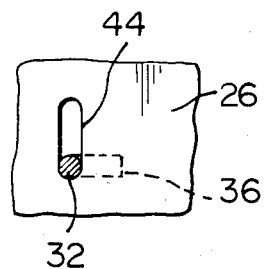
FIG. 4 is a cross-sectional view taken along line IV—IV in FIG. 3 showing a region of the mold.

Before placing the splice region of the cable within the mold cavity 41, a tie means in the form of a plastic tie wrap 42 is wrapped substantially tightly around the splice region 12 in a position substantially midway between its ends. The spliced region is then placed in the mold cavity as shown by FIG. 1. According to the present invention, the spliced region is then held substantially concentrically within the cavity so that a gap of generally constant width is formed between the outside of the splice region and the mold. This centralization process is performed by pushing the two hook members 30 through their apertures in the mold half 26. As can be seen from FIG. 4, each aperture 44 is of substantial length so as to allow for passage of the hook portion and the projection of its associated hook member. Each hook member, after passage through its aperture, is urged into contact with the outside of the splice region and is then turned through an angle of 90° so that the hook 40 passes between the splice region and the tie wrap so as to locate the hook in position. This turning movement of the hook member also moves the projection 36 into contact with the inside surface of the mold part 26 whereby the hook is held securely in position relative to the mold as shown by FIG. 3. Thus with the two hook members in these positions as shown by FIGS. 2, 3 and 4, it can be seen that the splice region is held securely within the mold cavity by being restrained from movement at two positions around its circumference.

The molding procedure then follows and, immediately the mold is filled with molten polyethylene encapsulating material, each of the hooks is removed by reversing the insertion procedure. This means that each hook is rotated in the opposite direction for 90° to align the projection 36 and the hook 40 with the length of the aperture in the mold part 26. Withdrawal of each hook member is then a simple process with the encapsulating material still in a molten and flowable condition. Removal of the hook is performed by parting of the molten material in its path and any void which is formed upon removal is immediately occupied by the flowing encapsulating material.

It is found that after removal of the hooks, there is no tendency for the splice region to move laterally within the mold cavity as the encapsulating material, even in molten form, has sufficient resistance to prevent such movement even though the outside forces provided by a bent cable attempt to create such lateral movement of the splice region.

It follows that the present invention as discussed in the above embodiment provides a satisfactory and simple process for centralizing a splice region within a mold during an encapsulating procedure. As a result of this, any problems which would stem from a de-centralized splice region within an encapsulation are avoided.

What is claimed is:

1. A method of forming an encapsulation around a sealed splice region between two cables comprising:
    disposing the cables within a mold to locate the splice region therein, the splice region having a tie means secured to it, then inserting at least two hook members through sufficiently large apertures in the mold;

turning the hook members (a) to engage the mold on inner and outer surfaces to retain them in a fixed position in relation to the mold cavity and (b) to engage the tie means at two circumferentially spaced positions around the splice region so as to secure the hook members to the splice region and hold the splice region disposed in a desired position within the cavity and spaced from the mold parts;

filling the mold cavity with molten encapsulation material; and removing the hook members from the mold with the encapsulating material still in a flowable condition.

2. The method according to claim 1 wherein the hook members are removed from the mold immediately after filling the mold cavity.

3. A method according to claim 1 comprising removing the hook members from the mold during the filling procedure and after sufficient molten material has entered the mold to hold the splice region in its fixed position.

* * * * *